United States Patent Office 3,117,839
Patented Jan. 14, 1964

3,117,839
METHOD OF PREPARING SORPTIVE MAGNESIA
Ronald M. Dell, Bristol, England, assignor to Air Products and Chemicals, Inc., a corporation of Delaware
No Drawing. Filed Dec. 29, 1958, Ser. No. 783,089
4 Claims. (Cl. 23—201)

This invention relates to magnesia possessing a high surface area, sometimes designated as activated magnesia or as sorptive magnesia. Such materials are useful as chromatograph adsorbents, as carriers for catalytic components, as basic catalysts and/or as agents for a variety of other purposes. Because sorptive magnesia readily rehydrates irreversibly, at least in part, it has always been considered quite different from sorbent materials such as sorptive alumina, sorptive silica, sorptive silica-alumina and the like, which can reversibly gain and lose moisture without significant permanent damage to high surface area properties. Sorptive magnesia consists predominantly of magnesium oxide, but may contain minor amounts of chemically combined water, carbon dioxide and/or compounds of iron, calcium, silicon, or other impurities.

Heretofore, sorptive magnesia has been prepared by the thermal dehydration of an appropriate magnesia containing material. Much of the commercially available sorptive magnesia has resulted from the dehydration of magnesium hydroxide in a rotary kiln. Sorptive magnesia also has been prepared by the thermal dehydration of basic magnesium carbonate, designated by formulas such as $5MgO \cdot 4CO_2 \cdot 5H_2O$ or $4MgO \cdot 3CO_2 \cdot 4H_2O$. The products from the dehydration of basic magnesium carbonate have been employed as powders, but not as granules because of the low crushing strength of such sorptive granules. Magnesium alcoholate has been dehydrated to provide magnesia gels of very high surface area, but the cost of such alcoholate derived magnesia gels has been so high that they have had only a limited usefulness.

In accordance with the present invention sorptive magnesia is prepared by a method which consists of the steps of purifying magnesium ammonium carbonate, heating purified magnesium ammonium carbonate at a temperature of about 100° C. to evolve ammonia, water, and carbon dioxide and to form an amorphous magnesium carbonate, and heating the thus prepared amorphous magnesium carbonate for from 1 to 20 hours at dry conditions in a dehydration zone at a temperature between 150° C. and 400° C. while rapidly withdrawing a stream of evolved gas to prepare sorptive magnesia having a surface area of at least 300 square meters per gram. Magnesium ammonium carbonate has the formula $MgCO_3(NH_4)_2CO_3 \cdot 4H_2O$. An aqueous solution containing magnesium ions and other ions may be treated with sufficient ethanol to provide about 30% ethanol, and then with ammonium carbonate, thereby precipitating substantially all of the magnesium ion as magnesium ammonium carbonate, but without the inclusion of troublesome amounts of other compounds. Hence, some analytical chemists have prepared magnesium ammonium carbonate. In the development of the present invention it was discovered that the active magnesia resulting from a partial thermal conversion of such magnesium ammonium carbonate at conditions minimizing the presence of water vapor possessed a large surface area, good stability at anhydrous conditions below dehydration conditions, and other advantageous properties.

The invention is further clarified by reference to several sets of experimental data, conveniently designated as examples.

Example 1

An excess concentration of ammonium ion is desirable during the preparation of $MgCO_3(NH_4)_2CO_3 \cdot 4H_2O$. In preparing 1 liter of an ammonium carbonate solution containing an ammonium ion concentration of about 2 molar, 76.8 g. (0.8 mol) of ammonium carbonate and 32 g. (0.4 mol) of ammonium nitrate are added to water. During about 60 minutes, a solution of 29.6 g. (0.2 mol) of magnesium nitrate in 200 ml. of water is added slowly to the ammonium carbonate solution. Although nucleation probably occurs promptly, visible crystals of the desired magnesium ammonium carbonate are formed only after aging for several minutes. After aging overnight, the precipitated crystals are recovered by filtration, and the magnesium ammonium carbonate is purified by being washed briefly with water and then with dry acetone, and dried by a current of dry air at room temperature. Chemical analysis establishes that the crystals are $MgCO_3(NH_4)_2CO_3 \cdot 4H_2O$. Apparently, the data relating to the X-ray diffraction of the magnesium ammonium carbonate have previously never been described in chemical literature, and hence the observations are set forth as follows:

| $d/n$ (X-ray line in Angstrom units) | $I/I_0$ (relative intensity of the X-ray line with the strongest line arbitrarily assigned a value of 100) |
| --- | --- |
| 6.17 | 78 |
| 4.55 | 45 |
| 3.85 | 90 |
| 3.31 | 7 |
| 3.08 | 100 |
| 2.92 | 7 |
| 2.78 | 20 |
| 2.57 | 10 |
| 2.40 | 10 |
| 2.28 | 18 |
| 2.14 | 5 |
| 2.04 | 18 |
| 1.93 | 27 |
| 1.75 | 10 |
| 1.58 | 5 |
| 1.39 | 5 |

It is important that the magnesium nitrate solution be added to the ammonium carbonate solution, inasmuch as the addition of the ammonium carbonate to the magnesium nitrate solution produces $MgCO_3 \cdot 3H_2O$, sometimes designated as nesquehonite.

The purified magnesium ammonium carbonate is heated to a temperature of 100° C., thereby evolving a gas mixture comprising ammonia, water and carbon dioxide, and thereby forming a solid residue with an open structure having a surface area of about 500 square meters per gram (conveniently designated as $m.^2/g.$). The high surface area solid is amorphous, as established by X-ray diffraction, and analyzes approximately $MgO(CO_2)_{0.6}(H_2O)_{0.7}$ and is conveniently designated as amorphous magnesium carbonate. When the amorphous material is heated to 140° C., sufficient shrinkage occurs to reduce the surface area to about 290 $m.^2/g.$ By careful heating of the amorphous material for from 1 to 20 hours at a temperature between about 150° C. and 400° C. and by rapidly withdrawing the evolved gases, activated magnesia having a surface area greater than 300 $m.^2/g.$ is prepared. If the amorphous magnesium carbonate is heated at 315° C. in a stream of dry air for six hours, the sorptive magnesia has a surface area of 428 $m.^2/g.$ If, however, the six hour heating is at 240° C., the area is lower by more than 10% (i.e., below about 380 $m.^2/g.$). Similarly, the area is 10% less than the maximum if the six hour heating is at 360° C. Hence, a range from 250° C. to 350° C. is preferred. Areas 30% less than the maximum result from heating the amorphous magnesium carbonate is a stream of dry air at either too low (e.g. 140° C.) or too high (e.g. 410° C.) a temperature, thus helping to establish the necessity for the 150–400° C. range for reliably achieving areas of at least 300 m.$^2$/g. If the temperature is as high as about 250° C., the amount of crystalline magnesia formed may permit its detection by X-ray diffraction, and the less amorphous product thus prepared has important advantages when the basic properties of the sorptive magnesia are desired.

The decomposition of magnesium ammonium carbonate in vacuum makes possible the preparation of an active magnesia at a temperature somewhat lower than is possible at atmospheric pressure.

When a sample of purified magnesium ammonium carbonate was heated slowly in a stream of dry air during a period of 16 hours to a temperature of 800° C., the surface area at various temperatures was as follows:

| Temperature, degrees | m.$^2$g. |
|---|---|
| 80 | 460 |
| 100 | 490 |
| 125 | 300 |
| 140 | 290 |
| 150 | 300 |
| 175 | 365 |
| 200 | 385 |
| 350 | 420 |
| 400 | 300 |
| 425 | 280 |
| 500 | 170 |
| 600 | 90 |
| 800 | 15 |

A sample of active magnesia derived from magnesium ammonium carbonate was allowed to sorb water vapor at 30–35° C., and was then subjected to vacuum to remove the gases readily desorbed at room temperature. A measurement of the ignition loss of the evacuated product then indicated that the amount of water retained after the evacuation amounted to 0.95 mol of water per mol of magnesia, thus suggesting that the water might be chemically combined as magnesium hydroxide. However, when the rehydrated product was heated at 150° C., most of the water was lost, thereby establishing that little, if any, magnesium hydroxide had been formed, and indicating that the number of mols of water not readily desorbed under vacuum at room temperature was nearly equal to the number of mols of magnesia fortuitously rather than because of a chemical formula. The temperature of decomposition of the hydroxide is much higher than 150° C. After the rehydrated magnesia had been dried at 150° C., its surface area had been reduced to 84 m.$^2$/g. Moisture thus catalyzes loss of surface area even at moderate temperatures, and this sensitivity to moisture is even more noticeable at elevated temperatures such as in the dehydration zone. Not only the sorptive magnesia product, but also the intermediate had unusual rehydration properties. The amorphous magnesium carbonate derived from magnesium ammonium carbonate was quite different from the amorphous magnesium carbonate prepared from nesquehonite in that a considerable portion of the water absorbed onto the amorphous magnesium carbonate derived from magnesium ammonium carbonate was removable by vacuum and did not instantly combine chemically in such a manner as to be retained by the solid after drying at 150° C.

*Example II*

Magnesium ammonium carbonate is prepared by allowing the precipitated crystals to age overnight after the addition of a solution of magnesium nitrate to an excess of ammonium carbonate solution. The magnesium ammonium carbonate crystals are purified by washing with water, and are then subjected to a vacuum chamber in which the temperature is increased slowly from room temperature is increased slowly from room temperature to 100° C. The thus prepared amorphous magnesium carbonate is heated in an evacuated dehydration zone for 1 hour at 380° C. while withdrawing the evolved gases by means of a vacuum pump. The resulting sorptive magnesia has a surface area greater than 300 m.$^2$/g., and is useful as a sorptive magnesia.

*Example III*

Purified crystals of magnesium ammonium carbonate are heated in a stream of dry air at 100° C. for 1 hour to prepare an amorphous magnesium carbonate. This product is transferred to a vacuum chamber and heated in an evacuated dehydration zone for 20 hours at 160° C. while withdrawing the evolved gases by means of a vacuum pump. The resulting product is a sorptive magnesia having a surface area greater than 300 m.$^2$/g. Inasmuch as the sorptive magnesia is prepared at a temperature very much lower than that customarily used in the manufacture of sorptive magnesia, its properties are quite different from those generally associated with sorptive magnesia. The sorptive magnesia has advantages as a high surface area carrier for a catalyst for reactions to be conducted in the absence of either acid or base under anhydrous conditions below about 160° C.

*Example IV*

Purified crystals of magnesium ammonium carbonate are converted to amorphous magnesium carbonate by the application of moderate heat, and the amorphous magnesium carbonate is heated in a stream of dry gas (e.g., dried and recirculated carbon dioxide) at 390° C. for 3 hours to prepare a sorptive magnesia having a surface area greater than 300 m.$^2$/g. Notwithstanding the presence of excess carbon dioxide, the magnesia product is substantially free from combined carbonate, and has the high basicity of sorptive magnesia. When employed under anhydrous conditions at temperatures below 390° C., such as a catalyst for the reaction between ethylene oxide and ammonia to form ethanolamine, such sorptive magnesia has certain advantages.

Obviously many modifications and variations of the invention as hereinbefore set forth may be made without departing from the spirit and scope thereof, and therefore only such limitations should be imposed as are indicated in the appended claims.

What is claimed is:

1. The method of preparing sorptive magnesia which consists of the steps of: preparing an aqueous solution of a magnesium salt; preparing an aqueous solution of ammonium carbonate; slowly adding the aqueous solution of the magnesium salt to the aqueous solution of the ammonium carbonate to precipitate a magnesium ammonium carbonate having the formula $MgCO_3(NH_4)_2CO_3 \cdot 4H_2O$; purifying said magnesium ammonium carbonate; heating said purified magnesium ammonium carbonate to drive off ammonia, water, and carbon dioxide at a temperature of about 100° C.; heating the thus prepared amorphous magnesium carbonate at a temperature between 150° C. and 400° C. for from 1 to 20 hours at dry conditions in a dehydration zone while rapidly withdrawing a stream of evolved gas to prepare sorptive magnesia having a surface area of at least 300 square meters/gram; and cooling the thus prepared sorptive magnesia.

2. The method of claim 1 in which the evolved gas is withdrawn rapidly by evacuating the dehydration zone.

3. The method of claim 1 in which the evolved gas is withdrawn rapidly by passing a stream of dry gas through the dehydration zone.

4. The method of claim 1 in which the amorphous magnesium carbonate has a composition expressed by the formula $MgO(CO_2)_{0.6}(H_2O)_{0.7}$ and is heated at about 315° C. in a stream of dry air for about six hours to prepare sorptive magnesia having a surface area exceeding 400 square meters/gram.

References Cited in the file of this patent

UNITED STATES PATENTS

| | | |
|---|---|---|
| 303,962 | Wunsche | Aug. 19, 1884 |
| 1,238,147 | Jesser | Aug. 28, 1917 |
| 1,986,323 | MacIntire | Jan. 1, 1935 |
| 2,322,554 | Winding | June 22, 1943 |
| 2,322,555 | Winding | June 22, 1943 |
| 2,357,987 | Winding | Sept. 12, 1944 |
| 2,888,323 | Teichner | May 26, 1959 |

OTHER REFERENCES

Mellor: "Comprehensive Treatise on Inorganic and Theoretical Chemistry," Longmans, Green and Co., New York, 1923, vol. 4, page 351.